March 24, 1953  H. J. NORRIS ET AL  2,632,348
WIRE BENDING AND TIGHTENING TOOL
Filed July 16, 1947  2 SHEETS—SHEET 1

INVENTORS
Howard J. Norris
James C. Reeves
BY *Victor J. Evans & Co.*
ATTORNEYS

March 24, 1953 H. J. NORRIS ET AL 2,632,348
WIRE BENDING AND TIGHTENING TOOL
Filed July 16, 1947 2 SHEETS—SHEET 2
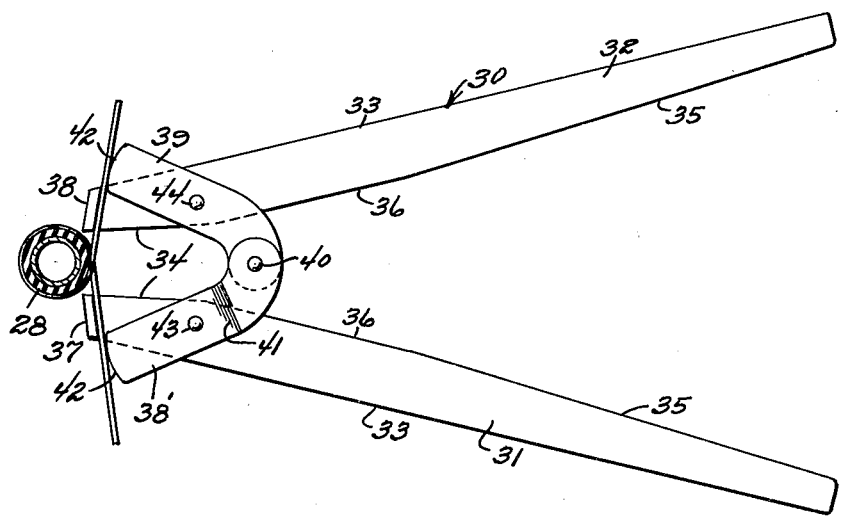
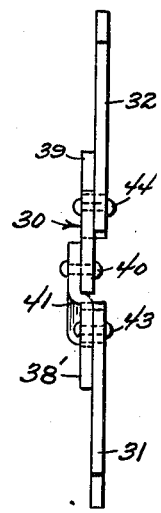
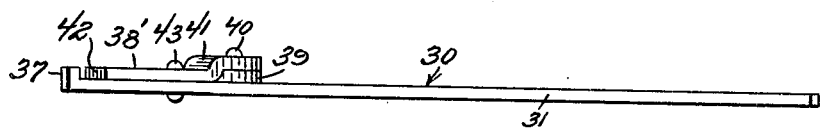
INVENTORS
Howard J. Norris
James C. Reeves
BY Victor J. Evans & Co.
ATTORNEYS Patented Mar. 24, 1953

2,632,348

UNITED STATES PATENT OFFICE 2,632,348

WIRE BENDING AND TIGHTENING TOOL

Howard J. Norris and James C. Reeves,
Torrance, Calif.

Application July 16, 1947, Serial No. 761,238

3 Claims. (Cl. 81—9.3)

1

This invention relates to improvements in wire tools and more especially to a tool which is designed to tighten a wire around a hose, pipes or pipe fittings.

An object of the invention is to provide a tool that can be used in wiring bales or bundles, can be used to splice and repair fences of barb wire, clothes-line wires or practically any kind of work that uses wire in the operation thereof.

Another object of the invention is to provide a tool of this type that is simple to operate, durable and inexpensive to manufacture.

With the above and other objects and advantages in view, the invention consists of the novel details of construction, arrangement and combination of parts more fully hereinafter described, claimed and illustrated in the accompanying drawings in which:

Figure 5 is an elevational view of a modified form of the invention;

Figure 6 is a plan view of Figure 5 and

Figure 7 is a side view of Figure 5.

Figure 1:
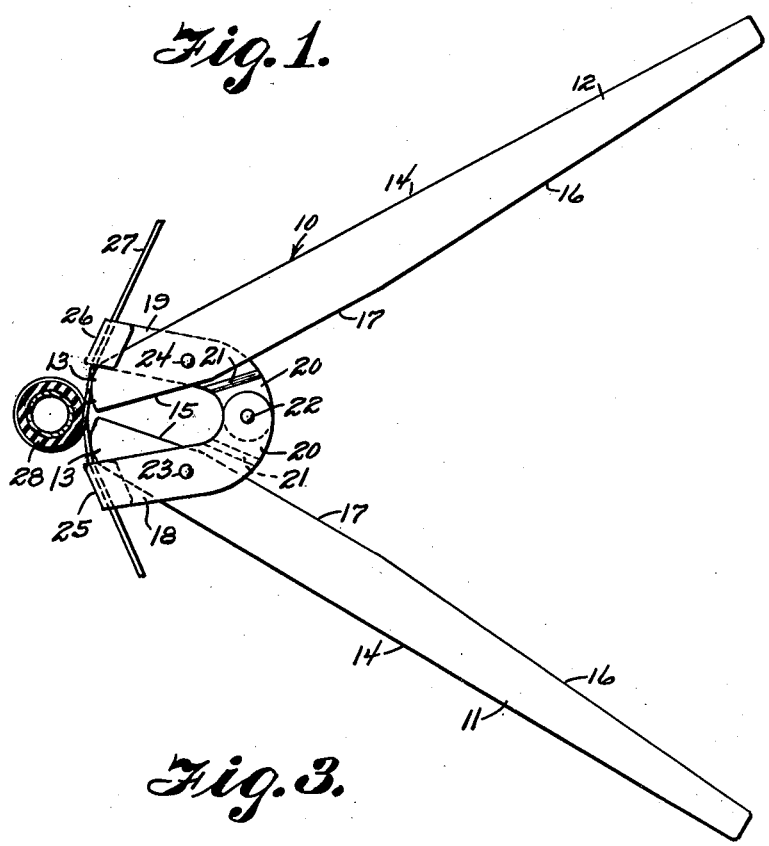
Figure 1 is an elevational view of an embodiment of the invention shown, bending a wire about a tubular article shown in section.
Figure 2:
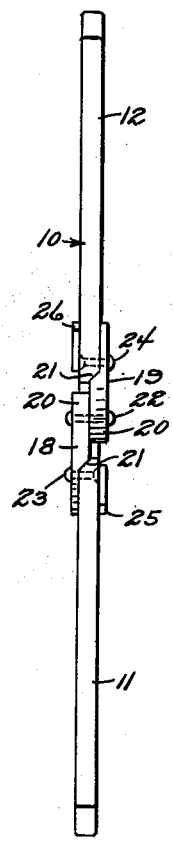
Figure 2 is a plan view of Figure 1.
Figure 3:
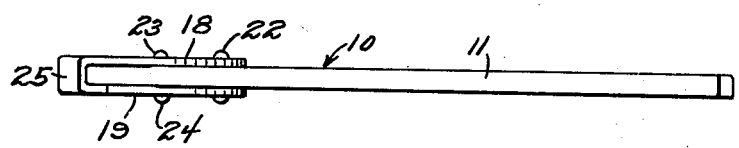
Figure 3 is a side view of Figure 1.
Figure 4:
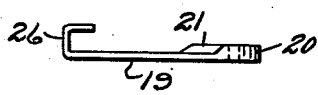
Figure 4 is a detailed elevational view of one of the jaws.

Referring more in detail to the drawings, the reference numeral 10 designates one form of the wire tool which comprises the handles 11 and 12 respectively. Each of the handles has a slightly curved fore end 13, a straight outer edge 14 and an outwardly tapered inside edge 15 toward the fore ends and a reversely tapered inside edge 16 toward the rear edge, the tapered edges, at their summits, being joined by the straight intermediate inside edge 17.

A pair of substantially L-shaped jaws 18 and 19 respectively are provided with an enlarged portion 20 having a bevelled edge 21, and a pin 22 passing through their portions pivotally joins these jaws to form a substantially U-shaped construction.

The jaw 18 is pivoted at its center at 23 to one face of the handle 11, and the jaw 19 is pivoted at its center at 24 to the opposite face of the handle 12. The jaw 18 is provided with a hooked end 25 which extends in a direction opposed to the side of the handle on which the jaw is pivoted. The jaw 19 is provided with a hooked end 26 which extends oppositely to the hooked end 25 of the jaw 18 and to the side of the handle on which the jaw is pivoted. By this construction, the

2 hooked ends of the jaws overlie the curved ends of the handles. Such structure is obtainable through the medium of the portions 20 which contact each other at the pivot 22.

In use, the wire 27 is wrapped around an article 28, as shown in Figure 1. The handles of the tool 10 are moved outwardly to their widest point at the rear ends thereof. The hooked ends of the jaws are then placed on opposite sides of the wire, and the wire is positioned between the hooked ends of the jaws and the curved ends of the handles. The handles are then moved inwardly to compress the wire between the hooked ends of the jaws and the rounded ends of the handles to obtain a non-slipping grip. By making a one-half revolution of the tool, the wire is securely bound on the article. To make a double wrap, the tool is removed, the wire is bent about the article in the opposite direction and the foregoing operation is repeated.

In the modified form of the invention shown in Figures 5 to 7 inclusive, the tool 30 comprises handles 31 and 32 respectively. Each of the handles has a straight outer edge 33, and an outwardly tapered inside edge 34 toward the fore end of the handles, and a reversely tapered inside edge 35 toward the rear edge of the handle, and the tapered edges, at their summits, are joined by the straight intermediate inside edge 36.

The handle 31, at its fore end, is bent horizontally at right angles to the handle at 37, and the fore end of the handle 32 is bent horizontally at right angles to the handle at 38 in the same direction as the bend 37 of the handle 31.

A pair of substantially L-shaped jaws 38' and 39 are pivoted together at 40 to form a substantially U-shaped construction, and the jaw 38' is provided with an offset bend 41 to permit clearance of the jaws in their pivotal movements. The jaws, at their free ends, are slightly curved as at 42, and the jaw 38' is pivoted at its center at 43 to one face of the handle 31, while the jaw 39 is pivoted at its center at 44 to the handle 32. The jaws are unlike the jaws 18 and 19, which are disposed in opposite planes, since in the modified form, the jaws 38 and 39 lie in the same plane with relation to the faces of the handles 31 and 32 respectively.

The operation of the modified form of the invention is the same as previously described, except that hooked ends of the handles are placed on the same side of the wire 27 and the curved ends of the jaws compress the wires between the jaws and hooked ends of the handles.

The tool is simple to operate, and performs an efficient job when used in the described manner.

It is believed that from the foregoing description, the operation and construction of the invention will be apparent to those skilled in the art, and it is to be understood that changes in the minor details of construction, arrangement and combination of the various parts may be resorted to, provided they fall within the spirit of the invention and the scope of the appended claims.

Having thus described the invention, what is claimed as new and desired to be secured by Letters Patent is:

1. A tool of the type described, comprising two similar shaped members, a pair of L-shaped members, means for pivotally connecting the L-shaped members to the said similar shaped members, said means being positioned at the center of the L-shaped members and adjacent the fore ends of the said similar shaped members, wire engaging and compressing ends on the fore ends of the said members, adapted to cooperate with each other in the bending of wire placed therebetween, and each of said L-shaped members is provided with an enlarged portion having a bevelled fore edge and a pivot pin passing through said enlarged portion to provide free pivotal relation to each other and said L-shaped members are pivoted to said similar shaped members in parallel relation to each other and to said similar shaped members, and a wire engaging end of the similar shaped members are slightly curved and the wire engaging ends of the L-shaped members are bent at right angles to said L-shaped members to provide hooked ends and said hooked ends are disposed in oppositely extending horizontal disposed relation to each other and the curved ends of said similar shaped members are adapted to move within the hooked shaped ends of the said L-shaped members and clamp the wire therebetween.

2. A tool of the type described comprising two pairs of pivotally connected members, means for pivotally connecting one of each pair to each other at one end thereof, wire engaging and wire compressing ends on the fore ends of all members, the wire engaging end of one of each pair being slightly curved and the wire compressing ends on the fore ends of the other of each pair being bent at right angles to the plane of the respective members, both pairs of members being pivotally connected in parallel planes and the curved end of the said one of each pair adapted to move within the right angularly disposed end of the said other of each pair to clamp wire therebetween.

3. A tool as in claim 2 wherein the ends of each pair that is pivotally connected to each other is shaped to permit the pairs of members to be in parallel planes.

HOWARD J. NORRIS.
JAMES C. REEVES.

REFERENCES CITED

The following references are of record in the file of this patent:

UNITED STATES PATENTS

| Number | Name | Date |
|---|---|---|
| 679,870 | Stoddard | Aug. 6, 1901 |
| 810,724 | Crosby | Jan. 23, 1906 |
| 1,553,110 | Rich | Sept. 8, 1925 |
| 2,211,528 | Tays | Aug. 13, 1940 |

FOREIGN PATENTS

| Number | Country | Date |
|---|---|---|
| 82,100 | Switzerland | Sept. 1, 1919 |